UNITED STATES PATENT OFFICE.

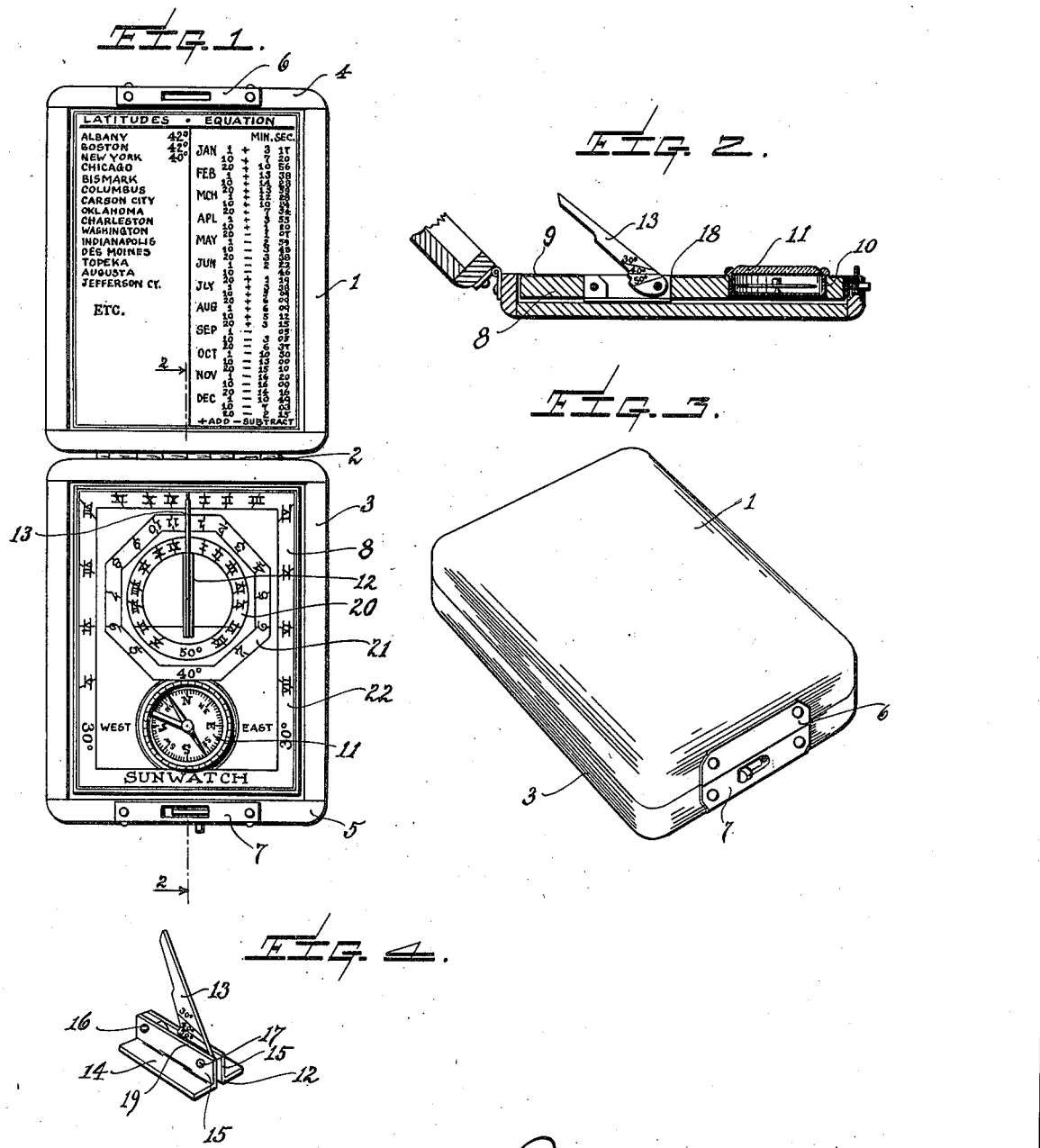

GEORGE HOLLINWOOD, OF CRANFORD, NEW JERSEY.

COMBINATION COMPASS AND SUN DIAL.

1,418,926.  Specification of Letters Patent.  Patented June 6, 1922.

Application filed April 20, 1921. Serial No. 463,040.

*To all whom it may concern:*

Be it known that I, GEORGE HOLLINWOOD, residing at Cranford, in the county of Union and State of New Jersey, have invented certain new and useful Improvements in a Combination Compass and Sun Dial, of which the following is a specification.

This invention relates to improvements in horological instruments, and one of the objects thereof is to provide a new and improved compass and sun dial.

Another object of the invention is to provide a portable sun dial of such construction that the gnomon or style may be adjusted to various angular positions whereby the instrument will give accurate time reading in different latitudes.

Other objects and aims of the invention more or less specific than those referred to above, will be in part obvious, and in part pointed out in the course of the following description of the elements, combinations, arrangements of parts and applications of principles, constituting the invention; and the scope of protection contemplated will be indicated in the appended claims.

In the accompanying drawing, wherein I have illustrated a preferred form of embodiment of my invention:

Figure 1 is a plan view of a casing in which my improved instrument is mounted, said casing being shown in open position.

Figure 2 is a sectional view taken on line 2—2 of Figure 1, looking in the direction of the arrow.

Figure 3 is a view in prospective of the aforesaid casing in which the instrument is enclosed; and Figure 4 is a view in perspective of the gnomon or style.

Referring now to the drawing, wherein similar reference characters refer to similar parts throughout the views thereof, the reference numeral 1 indicates the top part or cover of a casing which is shown to be hinged at 2 to the other part 3 of the casing. The end portions 4 and 5 of these parts of the casing are provided with locking means 6 and 7, so that the casing may be locked in closed position as shown in Figure 3 of the drawing.

Located in the part 3 of the casing is a plate 8, which plate may be made of any suitable material, such for instance as wood, to which may be pasted a strip of white paper 9, upon which the various characters may be printed. Seated in an opening 10, formed in the plate 8, is a compass 11.

The reference numeral 12 denotes a bracket, to which the gnomon or style 13 is pivoted, said bracket being provided with the flanged base portion 14, the upstanding parts 15 of the bracket being spaced apart so that the style 13 is clamped between them by means of the pins 16 and 17, the latter forming the pivot for the style 13.

The bracket 12 is located in a slot or opening 18, provided in the plate 8, so that said style stands directly in line with a line drawn between the north and south points upon the face of the compass. The convenience of this arrangement will be readily appreciated, as it will be understood that in order to set the sun dial in operative position, it is necessary that the style should lie along the true north and south line. In my new and improved device, the compass and style are so located relative to each other that it is only necessary to lay the device flat and then turn it until the north and south line of the compass card are directly under the compass needle. There is then a necessary correction to be made for the variation and when the compass is set so that allowance for variation is made, the sun dial itself lies in a correct position. The style is marked or calibrated so that it can be set in a plurality of predetermined angular positions upon its support, in the present instance the calibrations indicating positions upon its support, in which the style may be set to record upon its dial the time and latitudes of 30, 40 and 50 degrees. The position to which the style is set is determined by swinging the style until one of the lines indicative of 30, 40 or 50 degrees is in line with the upper edge 19 of the upstanding part 15 of the bracket.

The style co-operates with a plurality of dials indicated at 20, 21 and 22, the inner dial 20 being adapted to be utilized when the instrument is employed in a latitude of 50 degrees; the dial 21 being adapted to be utilized when the instrument is employed in a latitude of 40 degrees, and the dial 22 being adapted to be utilized when the instrument is employed in the latitude of 30 degrees. Each of the dials 20, 21 and 22 is provided with characters indicative of the hours of the day.

Located in the upper part of the casing is a card, the face of which bears the names of principal cities of the United States, together with the latitudes of such cities written opposite them. This card also contains a table of corrections which are to be added or subtracted, as the case may be, to the time indicated by the dial so that the correct reading of mean time may be arrived at by using the indicated solar time and then applying the corrections. It will be understood that the difference between mean and solar time varies with the day of the year, and I provide a table marked "equation" in which the correction corresponding approximately to the particular day has been worked out by the conversion equation.

It will accordingly be seen that I have provided an instrument well adapted to attain, among others, all the ends and objects above set forth. The instrument is not only of great value as a scientific instrument, but is also of great value as an educational device, being particularly adapted for boy scouts, and similar organizations, inasmuch as the person using it, can not only ascertain the points of the compass with respect to any given position, but can also ascertain the time of day by using the same in the manner above described.

Having thus described my invention what I claim as new and desire to secure by Letters Patent is:

1. In an instrument of the class described, in combination, a base member, a compass mounted thereon, a sun-dial carried by said base member, said sun-dial being provided with a plurality of rows of time indicating characters, each of said rows of characters being adapted to be utilized for a predetermined latitude, and said sun-dial being provided with a pivotally mounted style adapted to be set in different positions corresponding to the latitude where the instrument is to be used, whereby said style will read on different rows of characters in accordance with its different positions.

2. In an instrument of the class described, a base member, a compass mounted thereon, a sun-dial also carried by said base member, said sun-dial being provided upon its face with a plurality of sets of time indicating characters, each of said sets of time indicating characters being adapted for use in a different latitude, a style movably supported upon said sun-dial, adapted to be moved to different angular positions relative to said base member, whereby said style will read on different rows of characters in accordance with the latitude of the place where the sun dial is to be used.

3. In an instrument of the class described, in combination, a support provided with a pair of recesses, a compass having a compass card mounted in one of said recesses, a pair of brackets mounted in the other recess provided with upwardly extending parallel flanges, said flanges lying along the north-south line of the compass card, a style pivotally mounted between said flanges and provided with a suitable scale whereby said style may be set in different angular positions relative to said support in accordance with the latitude of the place where the instrument is to be used, and a sun dial mounted on said support and encircling said style, said sun dial being provided with a plurality of rows of time indicating characters whereby the setting of the style in different angular positions will cause it to read on different rows of characters.

4. In an instrument of the class described, in combination, a support having a pair of recesses in the face thereof, a compass located in one of said recesses, a pair of brackets located in the other recess and having upwardly extending parallel flanges, a style pivotally mounted in said flanges and adjustable angularly relatively to said support, a scale on said style whereby said style may be set in positions varying with the geographical location of the instrument, and a sun dial mounted on said support having a plurality of rows of time indicating characters, the dial and the style being so positioned that the style will read on varying rows of characters in accordance with its different angular positions.

5. In an instrument of the class described, in combination, a support provided with a plurality of time indicating scales, a pair of recesses in said support, a compass having a compass card mounted in one of said recesses, and a pair of uprightly flanged brackets mounted in the other recess in spaced relation, said brackets having their upright flanges parallel to each other and to the north-south line of the card, a style pivotally mounted between said flanges and bearing on its lateral surface a scale whereby said style may be set in varying angular positions in accordance with the latitude of the geographical location of the instrument, the relative positions of the style and the time-indicating scales being such that the setting of the style in different angular positions will cause it to read on different scales.

In testimony whereof I affix my signature in the presence of two witnesses.

GEORGE HOLLINWOOD.

Witnesses:
EMMA WEINBERG,
MALVINA SPIEGLER.